United States Patent [19]

Shurts

[11] Patent Number: 5,572,673

[45] Date of Patent: Nov. 5, 1996

[54] SECURE MULTI-LEVEL SYSTEM FOR EXECUTING STORED PROCEDURES

[75] Inventor: Scott A. Shurts, Walnut Creek, Calif.

[73] Assignee: Sybase, Inc., Emeryville, Calif.

[21] Appl. No.: 162,341

[22] Filed: Dec. 1, 1993

[51] Int. Cl.$^6$ ....................................... G06F 12/14
[52] U.S. Cl. ................ 395/186; 395/616; 364/286.5; 364/DIG. 1
[58] Field of Search ....................... 395/600, 575, 395/725, 186, 490, 491; 364/DIG. 1, DIG. 2

[56] References Cited

U.S. PATENT DOCUMENTS

| | | | |
|---|---|---|---|
| 5,126,728 | 6/1992 | Hall | 340/825.3 |
| 5,193,185 | 3/1993 | Lanter | 395/600 |
| 5,265,221 | 11/1993 | Miller | 395/725 |
| 5,283,830 | 2/1994 | Hinsley et al. | 380/25 |
| 5,355,474 | 10/1994 | Thuraisngham et al. | 395/600 |
| 5,371,794 | 12/1994 | Diffie et al. | 380/21 |
| 5,408,657 | 4/1995 | Bigelow et al. | 395/600 |
| 5,511,122 | 4/1996 | Atkinson | 380/25 |

Primary Examiner—Thomas G. Black
Assistant Examiner—Maria N. Von Buhr
Attorney, Agent, or Firm—Jeffrey K. Weaver; John A. Smart

[57] ABSTRACT

A database management system is provided for security of database objects. These objects may be passive elements such as tables, rows, views, the databases themselves, etc., or they may be executable items such as stored procedures or triggers. A mechanism is provided for "certifying" that certain types of objects such as stored procedures, triggers, and views can be safely used to access other, sensitive objects in the database. Certification indicates that (1) a security officer has evaluated and certified the object, and (2) the now certified object has not undergone a defined security-relevant change since certification. Certification is particularly important in the context of a "trusted" stored procedure or a "trusted" stored trigger. "Trusted" executable objects can be executed at sensitivity levels that exceed that of a user or subject. Thus, the subject may use a trusted stored procedure or trigger to access certain objects having higher sensitivity levels than his or her own. If the certified object changes in a security-relevant manner, its "certification state" changes from certified to "suspect" which causes the object to become unexecutable.

26 Claims, 11 Drawing Sheets

| STATES | CERTIFIED | | UNCERTIFIED | | SUSPECT | |
|---|---|---|---|---|---|---|
| | EXECUTE | RECOMPILE | EXECUTE | RECOMPILE | EXECUTE | RECOMPILE |
| STORED PROCEDURE | Y | N | Y | Y | N | N/A |
| TRUSTED STORED PROCEDURE | Y | N | N | N/A | N | N/A |

*FIG. 4*

| SENSITIVITY | NAME | ID | STATE | MAX READ | MAX WRITE | MIN WRITE | CURREAD | CURWRITE |
|---|---|---|---|---|---|---|---|---|
| CLASSIFIED | SPECIAL | 256738 | CERTIFIED | TOP SECRET | SECRET | CLASSIFIED | CLASSIFIED | CLASSIFIED |
| SECRET | T1 | 396117 | NULL | NULL | NULL | NULL | NULL | NULL |
| CONFIDENTIAL | V1 | 513727 | UNCERTIFIED | NULL | NULL | NULL | NULL | NULL |

FIG. 10

SECURE MULTI-LEVEL SYSTEM FOR EXECUTING STORED PROCEDURES

The present invention relates to security and integrity controls on database objects in computer systems. More particularly, the present invention relates to secure database management systems that allow stored procedures to safely execute at sensitivity levels different than the sensitivity level of a subject initiating execution of the stored procedure.

BACKGROUND OF THE INVENTION

Defense and commercial entities often store sensitive information in computer databases. Without adequate safeguards, an enemy or competitor could read or even tamper with a database's sensitive information. Various methods have been employed to protect data in databases from such unauthorized access. For example, database users are typically required to login with unique user IDs and passwords before accessing databases. Further, users' login accounts are often configured with clearances or "sensitivity levels" controlling the level at which the users may operate within the database system. For example, some users may be able to operate at a classified sensitivity level but not at secret or top secret. Still further, some database management systems permit auditing of various users, terminals, data objects, etc. Thus, suspicious activity can be detected and traced through an audit trail. These and other features of database management systems are described in "Sybase SQL Server," Reference Manual: Volumes 1 and 2 (Document ID 32401-01-1000) and in "Building Applications for Secure SQL Server" (Document ID 36030-010-1000), both available from Sybase, Inc. 6475 Christie Avenue, Emeryville, Calif. 94608. These documents are incorporated herein by reference for all purposes in their entireties.

A security policy known as "discretionary access control" or "DAC" allows designated database system administrators and/or owners (i.e., creators) of database objects to grant and revoke access privileges to specific users. More specifically, the owner or administrator grants specified users permission to execute specified commands and to access specified tables, views, and columns. This policy is "discretionary" because the object owner or designated system administrator can grant and revoke privileges at his or her discretion. Unfortunately, DAC has some notable security holes such as the "Trojan Horse" problem. A user having privileges for some objects but not others can create software (the Trojan Horse) to change the status of or copy a restricted object to which he or she does not have access. If someone having access to the restricted object then runs the Trojan Horse software, the DAC security system is circumvented.

Another security policy, known as "mandatory access control" or MAC, gives "subjects" access to database objects on the basis of sensitivity labels only. The concept of "subjects" and "objects" is central to a MAC policy. A subject is an active entity, such as a user at a workstation or a command that acts on behalf of the user. An object is a passive entity that contains or receives information. Examples of objects include database tables, rows, views, and procedures. Before any object is accessed in a MAC system, the subject's sensitivity label is compared with the object's sensitivity label to determine whether the subject is allowed to access the object in the manner requested. If this comparison shows that the subject does not have a clearance dominating that of the object, read access is denied. Also, if the comparison shows that the object does not have a label dominating that of the subject, write access is denied. Because objects carry labels, the Trojan Horse security hole is closed in a MAC implemented database management system.

Although MAC does provide a fairly secure database, it is rather inflexible in that it greatly limits the range of objects that a user can access. Typically, the user can never read any objects that they do not dominate. Some database systems could benefit by allowing some users to access certain MAC-inaccessible objects for limited purposes such as entering unclassified information in a classified database table. MAC itself provides no mechanism for granting such limited access. One prior modification of MAC systems does grant users temporary blanket privileges to write-up (with no limit) or write-down (with no limit). In these systems, the user is given write privileges for every database level between his or her own level and the system highest level (write-up) or the system lowest level (write-down). Unfortunately, in most instances, only limited write-up or write-down privileges are necessary. For example, a user's label may be unclassified, while the label of the object he or she needs to modify is classified. The prior art blanket write-up privilege would allow the user to access not only the classified object, but all other objects in the system, up to the system's highest sensitivity level (e.g., top secret).

Thus, while MAC and DAC systems provide a fair degree of database security, other more flexible systems would be desirable. Specifically, a security system giving users carefully controlled access to objects having sensitivities outside the users' reach of their own would be desirable.

SUMMARY OF THE INVENTION

The present invention provides flexible database management systems having improved security for database objects. These objects may be passive elements such as tables, rows, views, the databases themselves, etc., or they may be executable items such as stored procedures or triggers. The invention provides an assurance in the form of a "certification" that certain types of objects such as stored procedures, triggers, and views used to access sensitive objects can be safely executed by various subjects. Certification indicates that (1) a security officer has evaluated and certified the object, and (2) a certified object has not undergone a defined security-relevant change since certification. Certification is particularly important in the context of a "trusted" stored procedure or a "trusted" stored trigger. Such "trusted" executable objects may have the unique attribute of being able to execute at sensitivity levels different from the subject's sensitivity level. Thus, the subject may use a certified trusted stored procedure or trigger to access objects having sensitivity levels that would prevent access in a MAC system. Preferably, in the systems of this invention, the subject can access such objects only through "certified" trusted procedures or triggers. Further, the systems of the invention preferably include a mechanism for detecting security-relevant changes in the certified object, and thereafter denying execution of the object. Preferably, the mechanism includes a step of changing the "certification state" of an object from certified to "suspect." Suspect objects cannot execute, thereby preventing subjects from accessing protected objects after a potential or actual security breach has occurred.

Certification indicates that an object in a particular database meets certain defined security criteria pertinent to that database. The security criteria may vary from system to system and are ultimately set by the database owners and administrators. One security criterion might be that certified objects can not read objects above a certain sensitivity level. Another security criterion might be that the certified object has only minimal potential for damaging accessed objects, etc.

Objects capable of being certified (e.g., procedures, triggers, and views) are always in one or another "certification state" that may be changed according to prescribed procedures. The available certification states include, at least, the states of "certified" and "suspect," and in preferred embodiments include the state of uncertified. Suspect objects will not execute or be accessible under any circumstances, while certified stored procedures will always execute. Further, "trusted" stored procedures—those procedures that can execute at levels different than that of the subject executing them—will execute only if they are in the certified state. The certification state of an object can be "explicitly" changed by a security officer who has (1) reviewed the object, (2) determined that its certification state should be changed, and (3) initiated a procedure that internally changes the certification state as desired. In addition, the certification state can change automatically or "implicitly" from "certified" to "suspect" if a defined security-relevant event occurs. One such defined security-relevant event may be deletion and recreation of a table or view referenced by the certified object. Referenced tables, views, and other referenced objects are those objects read and/or written to during execution of a trusted stored procedure or other executable object.

The trusted stored procedures of this invention contain two types of sensitivity labels: (1) read and write sensitivity labels used during execution, and (2) an access sensitivity label used to determine whether a subject can initiate execution of the stored procedure. The second of these, the access sensitivity label, is somewhat analogous to a conventional MAC label associated with an object. If the subject's read sensitivity label dominates the trusted stored procedure's access sensitivity label, the subject is granted access to the procedure. The read and write sensitivity labels used during execution of a trusted stored procedure have no counterpart in standard MAC policies. If a trusted stored procedure's read sensitivity label dominates a database object's access sensitivity label, the trusted stored procedure can read that object during execution. Similarity if a trusted stored procedure's write sensitivity label is dominated by an object's access sensitivity label, the trusted stored procedure can write to that object during execution. A subject's sensitivity labels need not dominate the trusted stored procedure's read and write labels in order for the trusted stored procedure to execute. In fact, a trusted stored procedure may access objects beyond the reach of the subject in normal operation. In preferred embodiments, such access is available only in the controlled environment of the certified trusted stored procedure so that the risk of a security breach is minimized or eliminated.

A preferred method of permitting a subject to access an object in a database in a computer system involves first initiating a task on behalf of the subject. As is well-known, when a user is operating in a multitasking environment (e.g., having a server and multiple clients), a task is created on behalf of the user. In this invention, the task initially contains the sensitivity label(s) of the user or subject. These labels include, at least, a current read and a current write label associated with the subject. When the subject attempts to execute a certified trusted stored procedure accessing a database object, the server first determines whether the subject's current read label dominates the procedure's access sensitivity label. Also, the server determines whether any objects referenced by the procedure have undergone a security-relevant change that would suspect the procedure. If the subject's read label dominates the procedure's access label, and the procedure is not suspect, execution of the procedure is initiated. During this process, the task adopts the sensitivity labels of the trusted stored procedure. Thereafter, the steps of the procedure are performed, accessing any referenced objects (assuming the task's current sensitivity labels allow access to the object) and then the process exits. Upon exiting, the labels of the trusted procedure are removed from the task and those present before execution of the procedure (usually the subject's labels) are re-applied.

These and other features of the present invention will be presented in more detail in the following specification of the invention and the several figures.

BRIEF DESCRIPTION OF THE DRAWINGS

FIG. 4 is a table detailing the execution and recompilation options for certain executable objects of the present invention;

FIG. 10 is an illustration of a system catalog excerpt containing entries for a trusted stored procedure, a table, and a view.

DESCRIPTION OF THE PREFERRED EMBODIMENTS

1. DEFINITIONS

Figure 1:
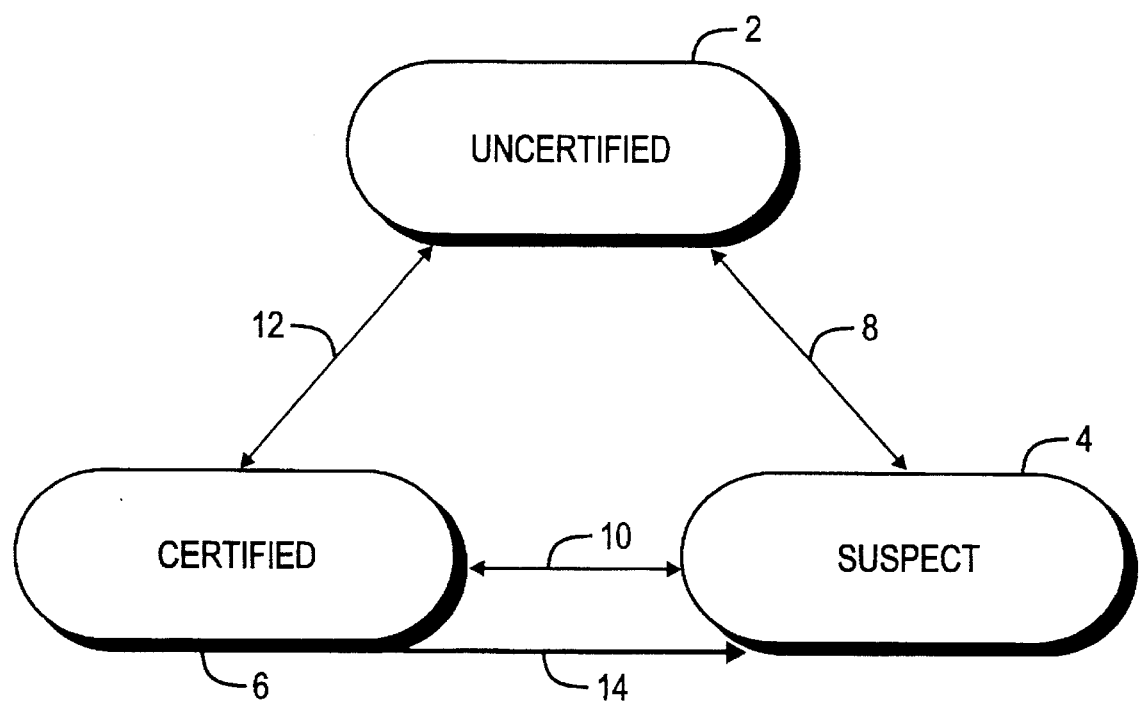
FIG. 1 is a state diagram showing the certification states and the permissible paths between these states in the security system of this invention.

The following terms are used in the instant specification. Their definitions are provided to assist in understanding the preferred embodiments described in the specification.

A "subject" is a user or a command executing on behalf of a user. The subject generally acts on "objects" by reading them or writing to them. In the databases of a preferred embodiment, the subject will have one or more sensitivity labels defining which objects it can access.

An "object" is an entity having certain attributes and, in the context of this invention, is stored in a database. Exemplary objects include databases, tables, rows, views, stored procedures, rules, etc. Attributes of some objects include columns and triggers. Objects are generally passive in the sense that they are acted upon by a subject, but they may be capable of performing actions when accessed by the subject. For example, a subject may initiate execution of an object such as a stored procedure, which is a read operation.

"Dominance" refers to a relationship between a subject and an object specifying whether the subject can access the object. In a MAC policy, a subject is permitted read access to an object when the subject "dominates" the object. Conversely, a subject is permitted write access to an object when the object dominates the subject. Generally, one item dominates another when the dominating item's sensitivity level is at or above that of the dominated item. In preferred embodiments, write access is granted only if the subject's write sensitivity label is equal to the object's access sensitivity label. In some embodiments, dominance is defined in terms of both a sensitivity level and one or more categories. If the subject's categories do not match the object's categories, access is denied.

"Sensitivity labels" are attributes associated with objects and subjects indicating a clearance level such as top secret, secret, confidential, classified, unclassified, etc. Within a database management system, the highest level will be referred to herein as "system high" and lowest level will be referred to as "system low." By comparing the sensitivity labels of a subject and an object, a database security system can determine whether the subject should be granted or denied access to the object. Those labels associated with objects and used to determine whether a subject can access the object are referred to herein as "access sensitivity labels." Those labels associated with subjects (or executing objects) and used to determine whether read/write privileges should be granted for a particular object are referred to herein as "read sensitivity labels" or "write sensitivity labels" depending upon the function of the subject. For some subjects (or executable objects), read and write labels can be specified over a range defined by "boundary sensitivity labels."

A "stored procedure" is a collection or encapsulation of statements, routines, built in calls, or other stored procedure calls describing an operation within a database. The statements comprising the procedure may be written in a database language such as ANSI standard structured query language "SQL" or other database language. Alternatively, the stored procedure statements may be written in a host language such as COBOL, C, PL/1, dBASE, INFORMIX 4GL, etc. The stored procedure code may be performance optimized so that it executes more efficiently. In preferred embodiments, the stored procedure automatically recompiles each time a change occurs.

"Compile" refers to an operation that produces operating code containing source statements. As used herein, "compilation" may include substeps such as parsing, normalizing, preprocessing, plan building, and optimization.

A "task" is one of possibly many programs or processes simultaneously running on the CPU of a computer system. Each task takes a percentage of the CPU depending upon the demands it makes while running. Each time a user logs on, a new task associated with the user is initiated and runs until he or she logs out. While a user is logged on, his or her task will store certain attributes such as his or her sensitivity label(s), etc. In preferred embodiments of this invention, the task includes a "sequence frame" containing information that may change within the context of a procedure. Tasks are sometimes referred to as "processes" in the context of UNIX and other operating systems.

A "system catalog" is a system table containing metadata (i.e., information about data in the system). Preferably the metadata is provided in tuples or rows for certain database objects. Each catalog row may include various attributes of a database object such as its object name, internal ID, owner, type (e.g., system table, user table, view, procedure, trigger, referential constraint, etc.), creation date, and audit settings. In addition, the catalogs of this invention preferably include an access sensitivity of the object (e.g. confidential, top secret, etc.) and may include up to five read and write sensitivity labels (for stored procedures and triggers) including current read, current write, maximum read, maximum write, and minimum write. Still further, certain views, triggers, and stored procedures will have a certification state contained within their tuples in the system catalog.

Security Officer—A database administrator, sometimes referred to as a system security officer or "SSO," who plays a role in the security of a database management system. He or she may have various administrative roles such as setting up server login accounts, overseeing changes to passwords, and managing the audit system. For the purposes of this invention, two very significant roles of the SSO are (1) certifying objects, and (2) configuring trusted stored procedures with sensitivity labels. Other security roles may be shared with a "system administrator."

System administrator or "SA"—A database administrator who has various administrative roles such as installing the server, managing disk storage, diagnosing and reporting system problems, backing up and loading databases, granting permissions to and ownership of database objects. In addition, the system administrator can have some security related roles such as creating and locking server login accounts.

2. OVERVIEW OF MULTI-LEVEL SECURE DATABASE

The present invention has many applications in the public and private sectors. For example, an automotive parts retailer who maintains a database listing stocked parts might wish to give some customers limited access to the database in lieu of printing catalogs. Assume that each automotive part in the database is given its own row divided into columns containing information of varying sensitivity such as the part numbers, list prices, performance specifications, suppliers, and the retailer's costs. Assume further that the database is divided into two tables, a first "unclassified" table accessible to all customers and a second "secret" table inaccessible to most customers. The unclassified table contains only part numbers, list prices, and performance specifications, while the secret table contains suppliers and costs. The database owner makes the unclassified information available to customers through an "unclassified" view of the first table. The suppliers and costs information are available in a different table labeled at "secret."

Some of the retailer's customers also supply some of his pans. To these suppliers, the retailer sometimes grants the right to access more sensitive information for the limited purpose of updating their price and other supply information. When a supplier needs to update his or her information in the secret table of his database, the retailer creates a trusted stored procedure having (1) a "certified" certification state, (2) a classified access sensitivity label, and (3) secret read and write sensitivity labels. The suppliers are given classified sensitivity labels so that they can initiate execution of the stored procedures. When a supplier executes the stored procedure, he or she can access and update the supplier and cost entries of the second table (through the "secret" read and write sensitivity labels), as well as the unclassified information in the first table. The suppliers can access this secret information only through the certified trusted stored procedure.

If for some reason, either of the database tables are deleted and then recreated under the same name—through a security breach for example—the certification state of the trusted stored procedure will become "suspect" and the stored procedure will no longer execute. This prevents the supplier from using the trusted stored procedure to reclassify, upgrade, or downgrade the information and ensures that the tables are the correct ones.

As the above example illustrates, certain objects have certification states. In preferred embodiments, an object may be in one of three certification states: certified, uncertified, and suspect. All objects (whether or not susceptible to certification) are created in the uncertified state. Uncertified objects behave like any object in a conventional database management system, such as those employing a MAC and/or DAC policy. They may be executed, written to, read by, etc., as appropriate, by a subject having the necessary privileges to access them. In MAC processes, they have one sensitivity level that must be dominated by a subjects' read sensitivity level for the subject to read them. If they are executable, they execute at their single level.

Objects that are initially in the uncertified state may be converted to a certified state. Once in the certified state, the object is guaranteed to have met certain security criteria defined for the particular database system in which they exist. Conversion of an object to the certified state requires an SSO to (1) evaluate the object to ensure that it meets the defined security criteria and (2) initiate an internal database procedure to change the state of the object to certified. Further, certified objects are guaranteed to have not changed in a defined security-relevant manner in the time since the SSO certified them. Because certified objects have an extra measure of security, they may be used in certain situations that would otherwise pose significant security risks. Objects in a suspect certification state, on the other hand, may present a security risk if they are executed. Thus, the significant feature of suspect objects is that they can not execute. If there is indeed a security risk associated with execution of suspect object, this feature ameliorates the risk.

FIG. 1 shows the three certification states and the permissible paths between them. The paths represent either (1) explicit state changes which are initiated by the SSO, or (2) implicit state changes which are performed automatically by the database management system in response to a specific event. An object in the uncertified state 2 may be explicitly converted to the suspect state 4 over path 8. Alternatively, the uncertified object may be explicitly converted to the certified state 6 along path 12. On the other hand, a suspect object or a certified object may be converted to an uncertified object by explicit changes along paths 8 and 12, respectively. The two headed arrows on paths 8 and 12 indicate that the explicit certification changes can take place in either direction. With respect to state changes between certified objects and suspect objects, two paths are available: explicit change 10 and implicit change 14. As can be seen, the explicit change 10 can proceed in either direction, while implicit change 14 proceeds only from certified 6 to suspect 4. Thus, an object can not become certified absent the SSO specifically initiating the change. In fact, in preferred embodiments, any state change except that converting a certified object to a suspect object (i.e., path 14) can be accomplished only by the SSO initiating an explicit change.

As noted, the implicit state change from certified to suspect may be triggered by a defined security-relevant event that has occurred to the certified object or some object that it references. In preferred embodiments, the security-relevant events that lead to the an implicit change of state from certified to suspect include deletion of a table or view referenced by the certified object. This will prevent execution of an object that references a table or view that has been deleted and then replaced with a different table or view of the same name. When a new referenced object is introduced in place of one that had been initially referenced when the certified object was certified, the new referenced object is given a different ID, which can be detected by the certified object. Because certified objects of the present invention identify referenced objects (or "base" objects) by an identification number rather than a name, they can detect when a referenced object has been replaced. This guarantees base object "instantiation integrity" or binding to specific instances of the base objects with the certified object.

While deleting or replacing a referenced object will initiate a state change of a certified object, simply modifying, adding, or deleting information contained in a table preferably will not initiate an implicit certification state change. Generally, it will be sufficiently safe if standard MAC and DAC policies are employed to protect against unauthorized modifications of referenced objects. Complete replacement of an object, however, presents a bigger security risk.

When a user or subject logs on in a multitasking environment, he or she is given a task. That task contains various pieces of information about the user, and most importantly for this invention, the user's current sensitivity label(s). These sensitivity labels are used to determine whether the user (or command on behalf of the user within the task) has a read or write label that allows access based on the sensitivity label of an object that the user wishes to access. When the user's label dominates the access sensitivity label of the object (in the sense defined for MAC), the user's task is given read access to the object. In preferred embodiments, the user's task will contain at least two and more preferably as many as five sensitivity labels. These labels include his or her current read ("curread"), current write ("curwrite"), maximum read ("maxread"), maximum write ("maxwrite"), and minimum write ("minwrite"). No minimum read level is specified because it is assumed that users can read down to the lowest level in the system. "Single level users" of the present invention will be given only a single nonadjustable value for both the read and write label. "Multi-level users," on the other hand, are given all five sensitivity labels. These users can specify their current read and write labels within the range defined by the boundary labels (maxread, maxwrite, and minwrite), but can not adjust their boundary levels. Stored procedures contain an access sensitivity label that must be dominated by the user's curread label in order for the user to execute the stored procedure. If the stored procedure has at least some of the other labels (curread, curwrite, maxread, maxwrite, and rainwrite), it is deemed a trusted stored procedure. When a user executes a trusted stored procedure, the labels of that procedure are applied to the user's task, albeit temporarily. When the procedure is finished executing, the trusted stored procedure's labels are replaced (in the task) with the user's original labels.

Figure 2:
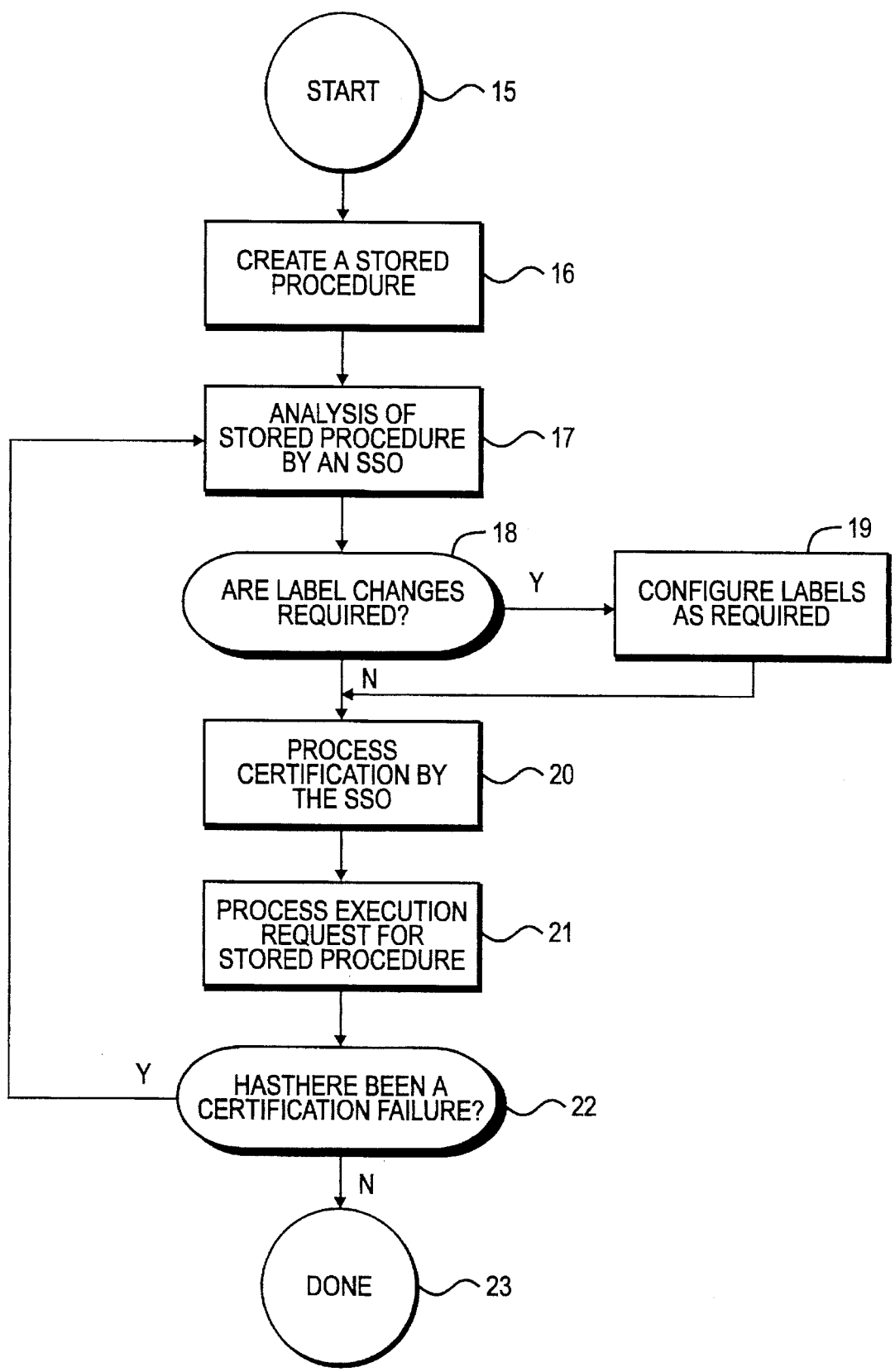
FIG. 2 is a process flow diagram of a preferred database security plan employing the system of the present invention.

FIG. 2 presents an overview of a preferred security system of the present invention. The process begins at 15 and then a stored procedure is created in a step 16. This involves partial compilation or "normalization" of the SQL code for the stored procedure, as detailed in FIG. 7. After the stored procedure has been created in step 16, the procedure is analyzed in a step 17 by an SSO to determine its security status (i.e. whether it should be certified) and other pertinent information. Preferably, the SSO will examine not only the stored procedure itself but the objects it references. After the SSO has analyzed the stored procedure, he or she may decide whether label changes are required in a step 18. For example if the stored procedure needs to read a top secret object during execution, but the procedure's maximum read level is currently secret, the SSO should reconfigure the procedure's maximum read label to be at least top secret. The SSO may also wish to configure the procedure's current read label to top secret. Thus, if step 18 is answered in the affirmative, the process moves to a step 19 where the procedure's labels are configured as required. This is accomplished by running a routine that modifies one or more system catalog entries for the procedure's read and write sensitivity labels.

Regardless of whether the SSO reconfigures the labels, next step (step 20) involves any changes to the procedure's certification instituted by the SSO. If a certification change is necessary, the SSO invokes an internal procedure which changes the object's certification state in the system catalog. Next, in a step 21, a request to execute the stored procedure is processed. This fairly involved procedure is described in more detail throughout the remainder of the specification. After the execution request has been processed (the procedure has not necessarily executed), a step 22 determines whether there has been a certification failure during processing of the execution request. If not, the process is completed at 23. If however, there has been a certification failure, the SSO will be notified and the process resumes at step 17 where the SSO analyzes the stored procedure to determine the nature of the failure. If the problem can be corrected, SSO may recertify the procedure in step 20.

Figure 3:
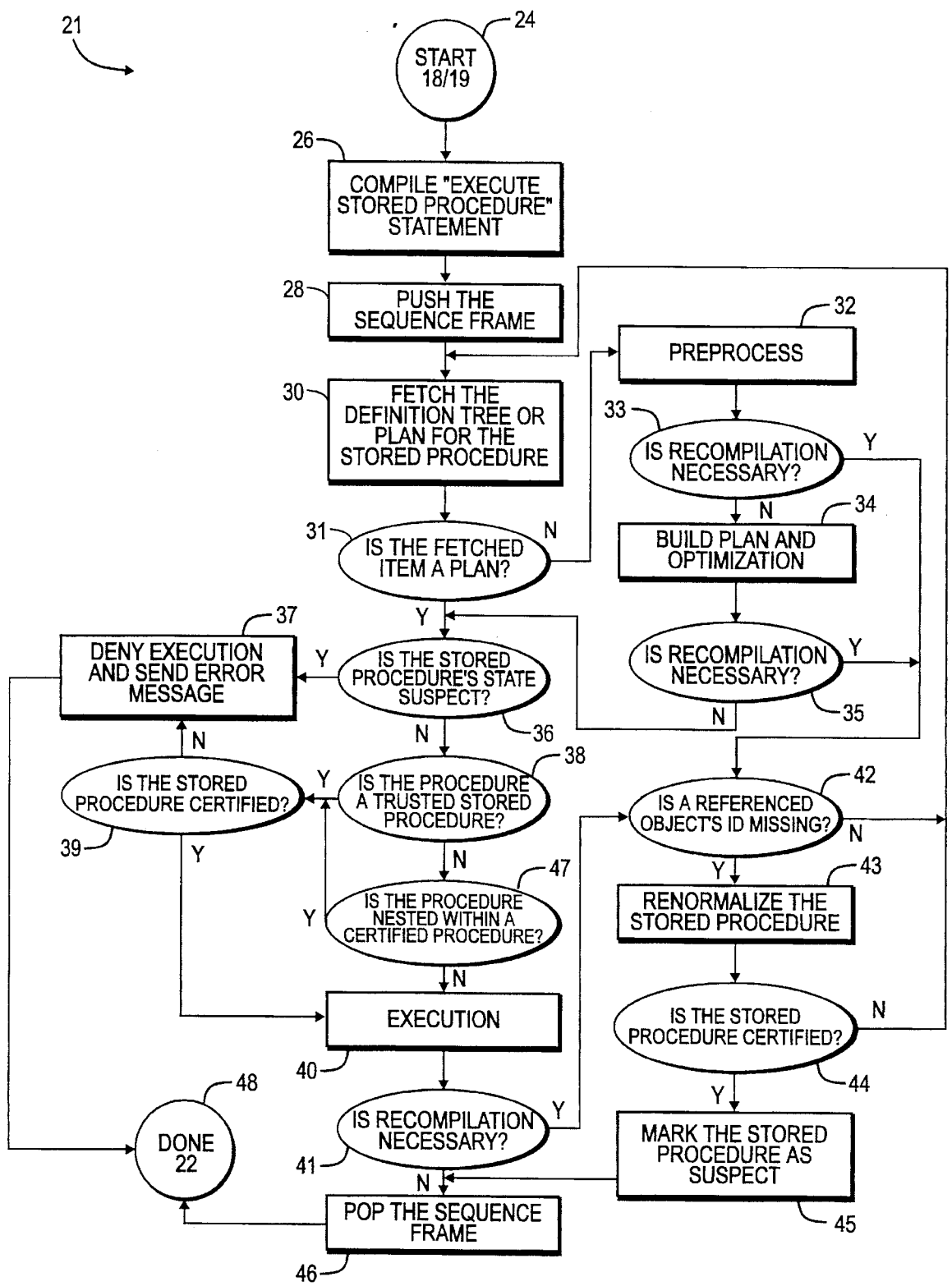
FIG. 3 is a process flow diagram of the principal steps employed in the database security system of this invention.

After the server creates the stored procedure (step 16 of FIG. 2), a subject may wish to execute the stored procedure. FIG. 3 presents an overview of the steps employed in processing an execution request (step 21 of FIG. 2). For purposes of this description, it is assumed that a stored procedure has been written as a sequence of SQL or other high-level language commands but has not yet been completely compiled or executed. Whether the stored procedure is a normal stored procedure or a trusted stored procedure is not specified at this point, as the server will subsequently determine the type of stored procedure. The process begins at 24 and a step 26 compiles the "execute [stored procedure]" command. Compilation of this command is required because it is typically provided in a high-level language like SQL which must be compiled before execution. The details of this compilation step will be discussed in detail with reference to FIG. 8.

As noted, a trusted stored procedure's read and write sensitivity labels are applied to the subject's task before the trusted stored procedure is executed. This is a accomplished by "pushing" the sequence frame of the users task in a step 28. As noted in the definitions presented above, each task includes a "sequence frame" containing procedural information associated with the task, including the current sensitivity labels. The sequence frame originally contains the subject's sensitivity labels. "Pushing" allows a new set of sensitivity labels (those of a stored procedure) to be a fixed to the task. After the sequence frame has been pushed in step 28, a step 30 fetches the "definition tree" or "plan" for the stored procedure. As will be explained in more detail below, the process of creating or "normalizing" a stored procedure produces (step 16 of FIG. 2) a definition tree associated with that stored procedure. If the stored procedure is subsequently run, a completely compiled version or "plan" is created. If a plan exists, it is simply used at this stage and the steps required to complete compilation of the stored procedure are avoided. A decision step 31 determines whether the stored procedure that has been fetched is in the form of a definition tree or a plan. Assuming that it is in the form of a definition tree, the remaining steps necessary for complete compilation on are now performed. First, a step 32 "preprocesses" the definition tree fetched in step 30 to yield a "resolution tree" which describes in tree form what the stored procedure will do. Next, a decision step 33 determines whether recompilation is necessary. This is determined by checking the status of the procedure during preprocessing. Recompilation may be required for various reasons such as a new constraint being added, a change in the defaults of the procedure, and, most notably for this invention, a table or other referenced object has been dropped. Assuming that recompilation is unnecessary and decision step 33 is answered in the negative, a process step 34 builds and optimizes a plan for execution. Compilation of the stored procedure is now complete. However, a decision step 35 again determines whether recompilation is necessary. As with decision step 33, this is accomplished by checking the status of the built plan. Assuming there are no problems necessitating recompilation, the process moves to a point after decision step 31. If decision step 31 (which had determined whether the fetched item was a plan) had determined that item was indeed a plan, steps 32, 33, 34, and 35 would have been skipped. Regardless of the answer to decision step 31, when a compiled plan is available, the process moves to a decision step 36 which determines whether the stored procedure's certification state is suspect.

Collectively, steps 36, 37, 38, 39 and 47 represent an "enforcement" mechanism of this invention. They will deny execution if (1) the procedure's certification state is suspect, (2) the procedure is trusted but not certified, or (3) the procedure is running within a certified stored procedure (i.e. it is nested) but it itself is not certified. If decision that step 36 determines that the stored procedure's certification state is suspect, a step 37 denies execution and may send an error message. Thereafter, the process is completed at 48. Assuming, however, that the stored procedure certification state is not suspect, the process moves to a decision step 38 which determines whether the stored procedure is a trusted stored procedure. A trusted stored procedure will have a collection of read and write sensitivity labels, while a normal stored procedure will have no such labels. If decision step 38 determines that the stored procedure is a trusted stored procedure (by identifying labels associated with trusted stored procedures in a system catalog), a decision step 39 determines whether the procedure is certified. Suspect or uncertified trusted stored procedures cannot execute. Thus, if decision step 39 determines that the trusted stored procedure is not certified, process control is directed to step 37 which denies execution and sends an error message. If on the other hand, decision step 39 determines that the trusted stored procedure is certified the stored procedure is executed at a step 40. If decision step 38 determines that the procedure is not a trusted stored procedure, a decision step 47 determines whether the current stored procedure is executing within another stored procedure, as when the procedures are nested. If step 47 is answered in the affirmative, decision step 39 determines whether the stored procedure is certified as described above. If, on the other hand, decision step 47 is answered in the negative, the stored procedure is executed at step 40.

After the stored procedure has been executed in step 40, a determines whether recompilation is necessary. Like decision steps 33 and 35 discussed above, this step determines whether the stored procedure is status presents any problems necessitating recompilation. The same kind of problems mentioned above—most notably a missing index on a referenced table or other object—lead to a determination that recompilation is necessary. Although these checks may have been performed above during preprocessing and plan building, it is possible that there has been some intervening change in the database (e.g., a referenced object has been deleted and subsequently recreated) which necessitates changing the security status of the stored procedure. Assuming that step 41 determines that recompilation is unnecessary, the process moves to a step 46 which pops the sequence frame back to its initial state. This results in the subject's initial sensitivity labels being reapplied to his or her task. In this manner, the subject is prevented from retaining a security clearance exceeding his or her login clearance. By temporarily pushing the sequence frame (and applying the sensitivity labels of the trusted stored procedure), the subject can temporarily take on a clearance that allows access to objects that would be inaccessible if he or she was running the procedure with his or her login sensitivity labels. For security reasons, it is preferable that this temporary change in clearance only be permitted in the context of a certified trusted stored procedure. After the sequence frame has popped at step 46, the process is completed at 48.

Anytime recompilation is necessary as determined in decision step 33, 35, or 41, the system of the preferred embodiment must determine whether the event provoking recompilation is sufficiently security-relevant that a certified object should be implicitly changed to a suspect object. This procedure is accomplished in steps 42–45 of FIG. 3. It begins with a decision step 42 which determines whether the event provoking recompilation is a missing ID for an object referenced by the stored procedure. If the answer is no, recompilation is not reason for concern, and process control returns to step 30 where the definition tree or plan for the stored procedures is fetched. If, however, a referenced object, ID is missing, a step 43 renormalizes the stored procedure (according to the steps detailed in FIG. 7 as discussed below). Thereafter, a decision step 44 determines whether the stored procedure is certified. This determination is made by checking the certification column in the system catalog row for the stored procedure. Because a missing ID for a table or other referenced object is a security relevant event, the server must be able to block further execution of a certified stored procedure until the security officer can determine whether the missing object presents a problem. As noted, one step of this precaution is to control the certification state of the stored procedure. Thus, if decision step 44 finds that the stored procedure is certified, a step 45 changes the certification state of the stored procedure from certified to suspect. Thereafter, the process is directed to step 46 (popping the sequence frame). If decision step 44 determines that the stored procedure is not certified (i.e., it was either uncertified or suspect), the process moves directly to step 30 (fetching the definition tree or plan for the stored procedure) without first changing the certification state.

As is apparent from the above discussion, various steps leading to execution of a stored procedure require evaluation of attributes of the subject and object, be it a table, stored procedure, etc. Such information includes, most notably, certification state and sensitivity label(s). For the subject, these attributes are initially defined at login time and then held in the subject's task. For the objects, this information is preferably stored in a system catalog for the database. Although the catalog will be described in more detail below, it should be noted that it contains a row for each object, and in each row, an access sensitivity label. For a trusted stored procedure, the row will also contain one or more of the five read and write sensitivity labels. And for objects capable of being certified, the row will contain the current certification state.

In preferred embodiments of the invention, the only objects that have certification states are procedural in nature, that is objects that reference or otherwise perform specific actions on other objects. Examples of such referencing objects include stored procedures, triggers, and views. Stored procedures may reference whole databases, tables, views, even other stored procedures. Triggers are executed in response to events such as updates of tables. Views reference tables or other views. While the invention is directed primarily to maintaining the security of such procedural objects, there is, in principle, no reason why aspects of this invention such as certification could not be extended to non-procedural objects such as tables. As noted, however, it will be sufficient to allow such objects to be protected by standard MAC and/or DAC policies.

The certification aspects of the present invention are preferably implemented during compilation and execution of executable objects such as trusted stored procedures. As is apparent, the general process of "compilation" includes various steps. Three of these—normalization, resolution (or "preprocessing"), and building a plan—may note a security-relevant change prompting the server to suspect a certified object. In addition, each time a stored procedure is executed, at least some of these checks are performed anew, thus providing continual protection. Further, during execution, each step that might reference an object capable of undergoing a security-relevant change is checked to ensure that such a change has not occurred. If such change has occurred, the certified procedure is recompiled and marked suspect.

FIG. 4 provides an overview of how a preferred embodiment of the invention treats recompilation and execution of normal stored procedures versus trusted stored procedures in the three certification states. As noted, stored procedures are automatically recompiled each time they are executed and if a problem is detected during execution. For purpose of FIG. 4, recompilation refers to compilation after a problem is detected during execution. In the normal state of prior systems such as those employing a MAC policy (i.e., an uncertified normal stored procedure), both execution and recompilation are permitted. In the context of the present invention, this is the only state in which both execution and recompilation are permitted without qualification. At the other extreme, suspect stored procedures (whether normal or trusted) can neither execute nor recompile. More precisely, recompilation is not applicable because a suspect procedure can never execute. Thus, no problem can be detected to provoke recompilation. Uncertified trusted stored procedures are treated like any suspect stored procedure: they can neither execute nor recompile. Certified objects, whether normal or trusted, can execute, but can not recompile because recompilation implies that a security-relevant change occurred during execution. Such security-relevant change would automatically change the state of the stored procedure to suspect.

3. PHYSICAL SYSTEM FOR IMPLEMENTING DATABASE SECURITY METHODS

The invention employs various process steps involving data stored in computer systems. These steps are those requiring physical manipulation of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bit patterns, values, elements, variables, characters, data structures, or the like. It should remembered, however, that all of these and similar terms are to be associated with the appropriate physical quantifies and are merely convenient labels applied to these quantities.

Further, the manipulations performed are often referred to in terms, such as adding, running, or comparing. In any of the operations described herein that form part of the present invention, these operations are machine operations. Useful machines for performing the operations of the present invention include general purpose digital computers or other similar devices. In all cases, there should be borne in mind the distinction between the method of operations in operating a computer and the method of computation itself. The present invention relates to method steps for operating a computer in processing electrical or other physical signals to generate other desired physical signals.

The present invention also relates to an apparatus for performing these operations. This apparatus may be specially constructed for the required purposes, or it may be a general purpose computer selectively activated or reconfigured by a computer program stored in the computer. The processes presented herein are not inherently related to any particular computer or other apparatus. In particular, various general purpose machines may be used with programs written in accordance with the teachings herein, or it may prove more convenient to construct a more specialized apparatus to perform the required method steps. The required structure for a variety of these machines will appear from the description given below.

Figure 5:
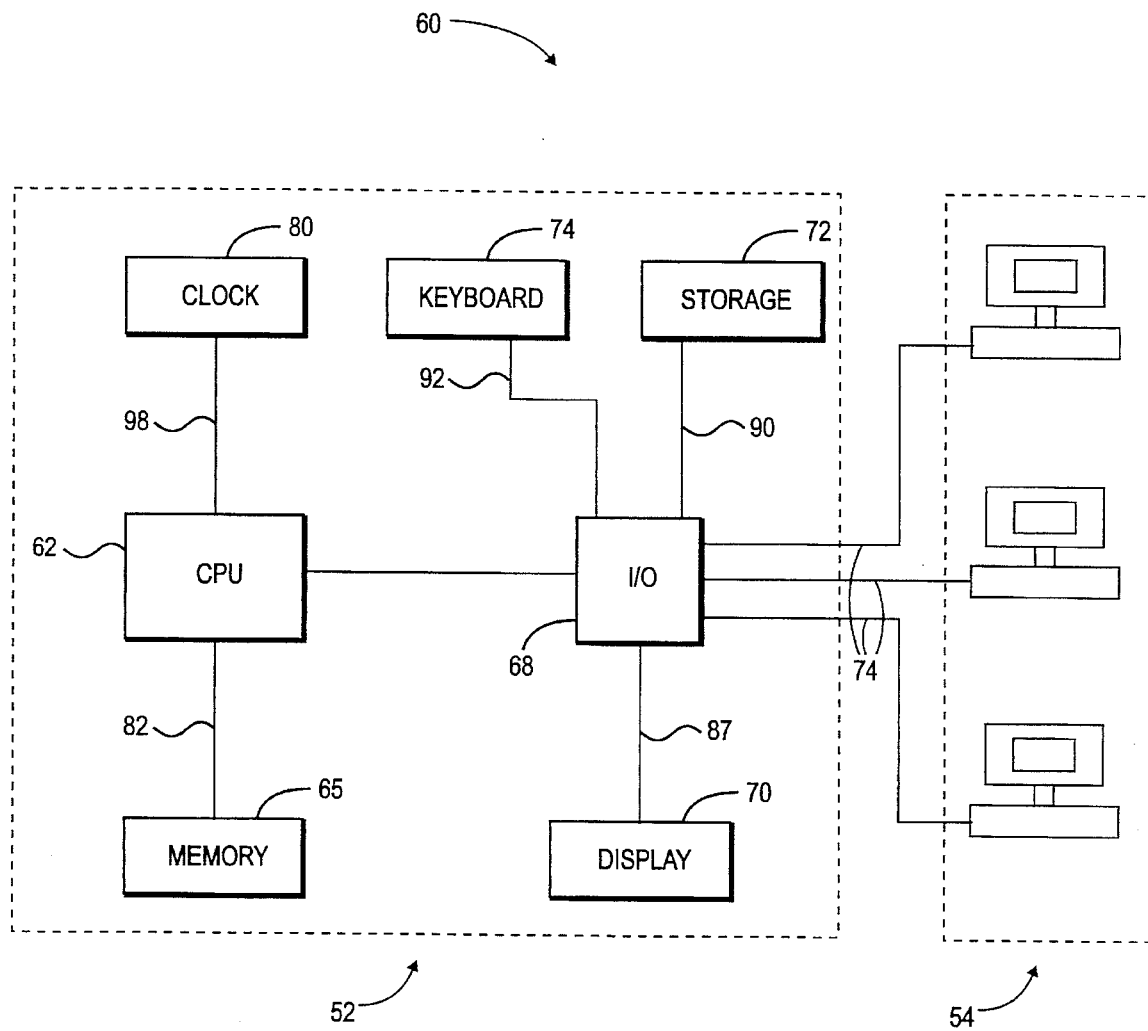
FIG. 5 is a block diagram of a client-server computer system used to implement the security system of this invention.

Referring now to FIG. 5, a preferred computer network 60 of the present invention includes a server 52 and multiple clients 54. In preferred embodiments, databases and database management systems are stored on a "server" while the various subjects can access the database through various "clients" which may be PCs, workstations, etc. in communication with the server. The client-server model of database management is well known to those of skill in the art and is discussed in various sources such as, for example, "The Guide to SQL Server" by Aloke Nath, Addison-Wesley Publishing Company, Inc., Reading, Mass. (1990).

The server 52 in accordance with the present invention includes a central processing unit (CPU) 62, input/output (I/O) circuitry 68, and memory 65—which may be read only memory (ROM) and/or random access memory (RAM). The server 52 may also optionally include a display 70, a mass storage unit 72, a keyboard 74, and a clock 80.

In one embodiment, the CPU 62 is preferably one or more microprocessor chips selected from complex instruction set computer (CISC) chips, reduced instruction set computer (RISC) chips, or other available chips. CPU 62 is coupled to memory 65 by a bidirectional data bus 82 but may also be coupled by unidirectional data bus in the case of ROM. Memory 65 is also coupled to CPU 62 by appropriate control and address busses, as is well known to those skilled in the art.

CPU 62 is coupled to the I/O circuitry 68 by bi-directional data bus 86 to permit data transfers with peripheral devices. I/O circuitry 68 preferably includes a number of latches, registers and direct memory access (DMA) controllers. The purpose of I/O circuitry 68 is to provide an interface between CPU 62 and such peripheral devices as display assembly 70, mass storage 72, keyboard 74, and clients 54. Display assembly 70 of server 52 receives data from I/O circuitry 68 via bus 87 and displays that data on a suitable screen. Mass storage 72 can be coupled to I/O circuitry 68 by a bi-directional data bus 90. Generally, mass storage 72 will be a hard disk drive, a tape drive, or some other long-term storage device.

The keyboard 74 communicates with the CPU 62 via data bus 92 and I/O circuitry 68. In addition to keyboard 74, other types of input device can also be used in conjunction with the present invention. For example, a computer mouse, a track ball, or a pen-based tablet can be used to manipulate a pointer on display screen 70. Clock 80 preferably comprises a real-time clock to provide real-time information to the system 60. Alternatively, clock 80 can simply provide regular pulses to, for example, an interrupt port of the CPU 62 which can count the pulses to provide the time function. Clock 80 is coupled to CPU 62 by a data bus 98.

The clients 54 may include terminals, personal computers, workstations, minicomputers, and mainframes. For purposes of this invention, any data processing devices coupled to server 52 are clients. It should be understood that the clients may; be manufactured by different vendors and may also use different operating systems such as MS-DOS, UNIX, OS/2, MAC OS and others. Clients 54 are connected to I/O circuitry 68 via bidirectional lines 74. Bidirectional lines 74 may be any suitable media such as coaxial cable, twisted pair wiring, fiber optic line, radio channels, and the like. Further, the network resulting from the interconnection of the lines 74 may assume a variety of topologies, including ring, bus, star, and may include a collection of smaller networks linked by gateways and bridges.

Figure 6:
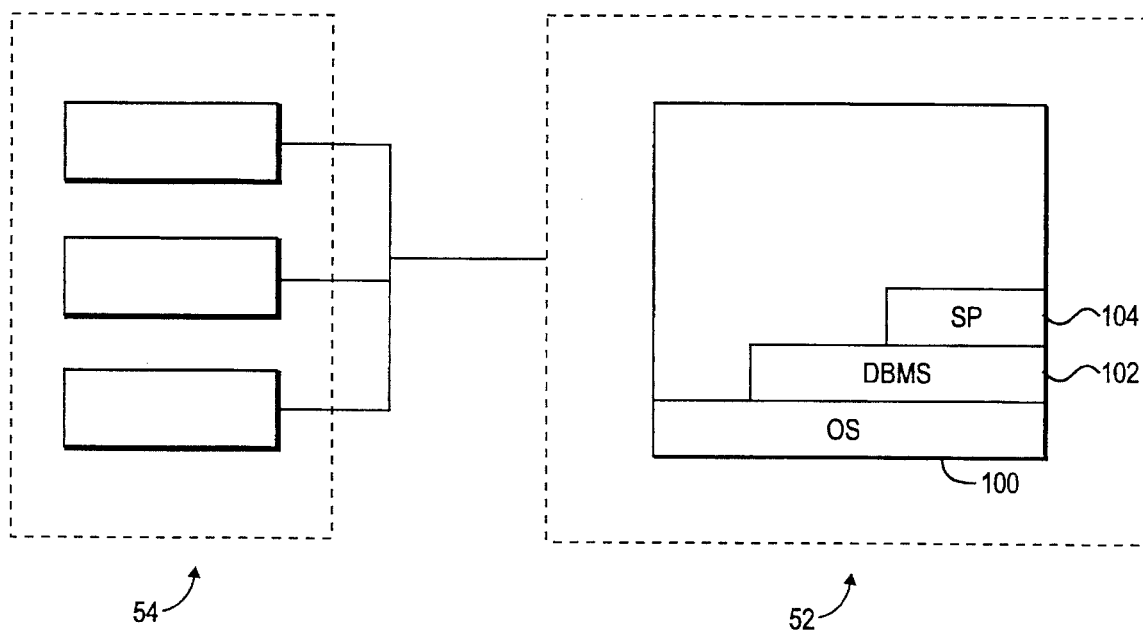
FIG. 6 is a block diagram detailing the operating system and procedure layers employed in the client-server computer system of FIG. 1.

FIG. 6 provides another illustration of the physical system of this invention, this time in connection with the layers of processing associated with a client-server architecture of the present invention. The server 52 includes a base operating system 100 associated with the computer hardware comprising the server. As with the clients 54, it should be understood that the server may use different operating systems such as MS-DOS, UNIX, VMS, MAC OS and others. The clients, of course, need not use the same operating system as the server. One particular suitable server operating system for the present invention is OS/2. Running on top of the machine operating system 100 is a database management system 102 which may also be viewed as an operating system, albeit a higher level operating system. The database management system 102 on the server manages storage and retrieval, including installation and deletion, of objects and otherwise manages the database. At the next higher level are the objects of the database such as tables, views, and triggers. In FIG. 6, a stored procedure 104 is shown at this level. The stored procedure is a collection of, for example, SQL statements describing operations to be performed by database management system 102.

4. COMPILATION AND EXECUTION OF STORED PROCEDURES

Figure 7:
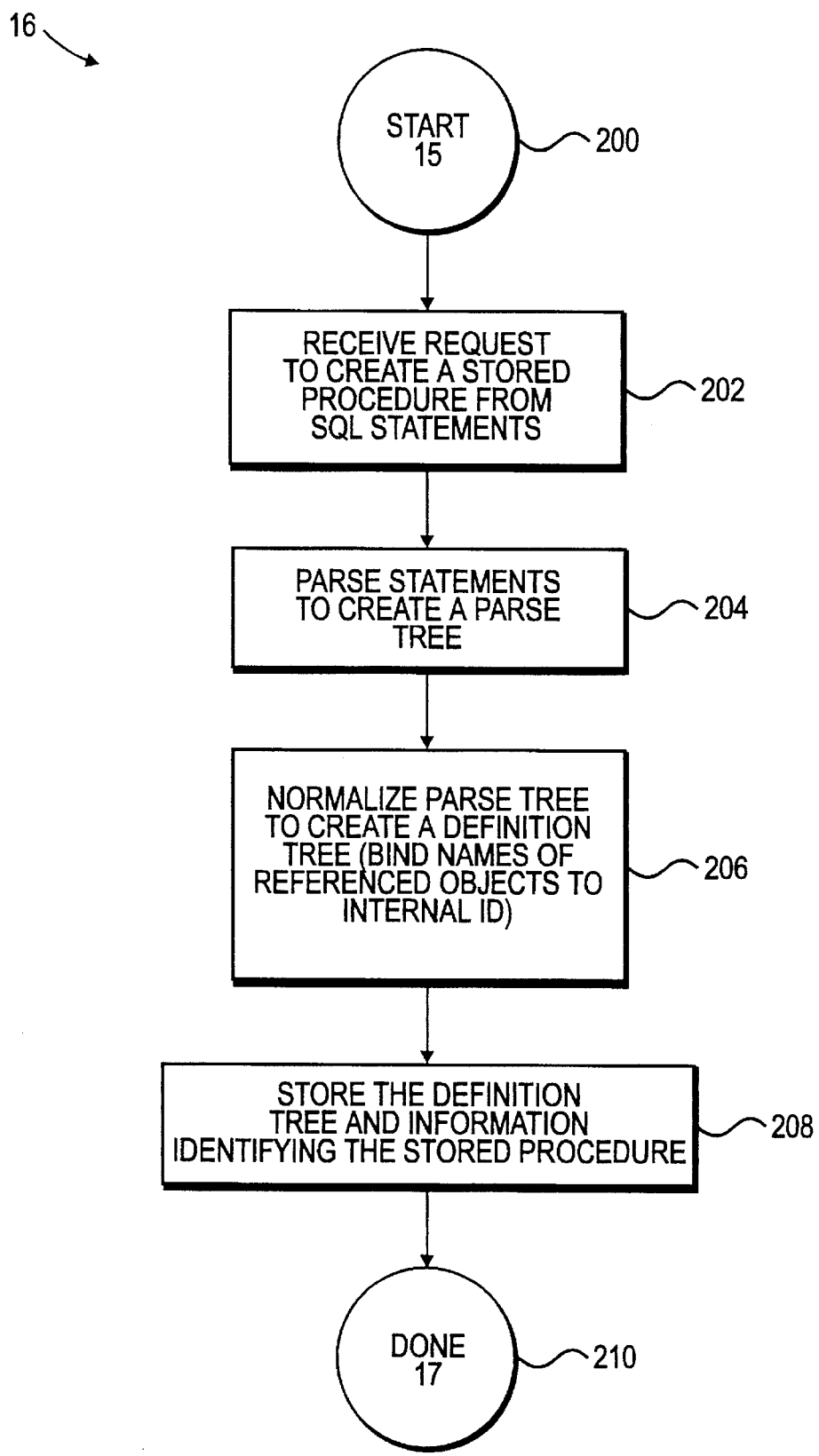
FIG. 7 is a process flow diagram detailing the steps used to create a stored procedure.

Referring now to FIG. 7, the steps employed to create a stored procedure are described. These steps correspond to general step 16 of FIG. 2. The process begins at 200 and proceeds to a step 202 where the server 52 receives a request to create a stored procedure (e.g., the SQL command "CREATE" is used to create a stored procedure). The instructions for the individual steps of the stored procedure are typically provided as source code—that is, a series of statements in an interpretive language. For example, one line of the procedure might state, in SQL, "SELECT * T1," where T1 is a table referenced by the procedure. From step 202, the process moves to a step 204 where the statements of stored procedure are parsed to produce a "parse tree," and thereafter to a step 206 where the parse tree is normalized to create a "definition tree." Both parse trees and definition trees are commonly prepared during compilation of stored procedures in database management systems. The definition tree produced in step 206 is not yet in a form that can be executed. The necessary additional steps are performed by the server as described in connection with FIG. 3 (steps 32–35). Finally, the definition tree created in step 206 is stored as a "stored procedure" and information identifying the stored procedure is provided in a step 208. The process is completed at 210.

During normalization, any objects referenced by the stored procedure have their internal IDs bound to the stored procedure's definition. Thus, the stored procedure references objects not by name, but by ID. For example, if the stored procedure states "SELECT* T1," an ID associated with table T1 is saved during normalization. If this ID changes—as it will when table T1 is deleted and then recreated—the definition tree of the stored procedure no longer references an existing object. As explained, this may prevent the stored procedure from executing until it is at least renormalized and rebound to the object with the new ID. Because replacing a referenced object could, if unauthorized, severely affect the integrity of the data, such replacements are viewed as security-relevant events. Thus, if a stored procedure referencing such an object is certified it will undergo an implicit state change to suspect. Before a suspect procedure can be reexecuted, an SSO will have to recertify it.

Figure 8:
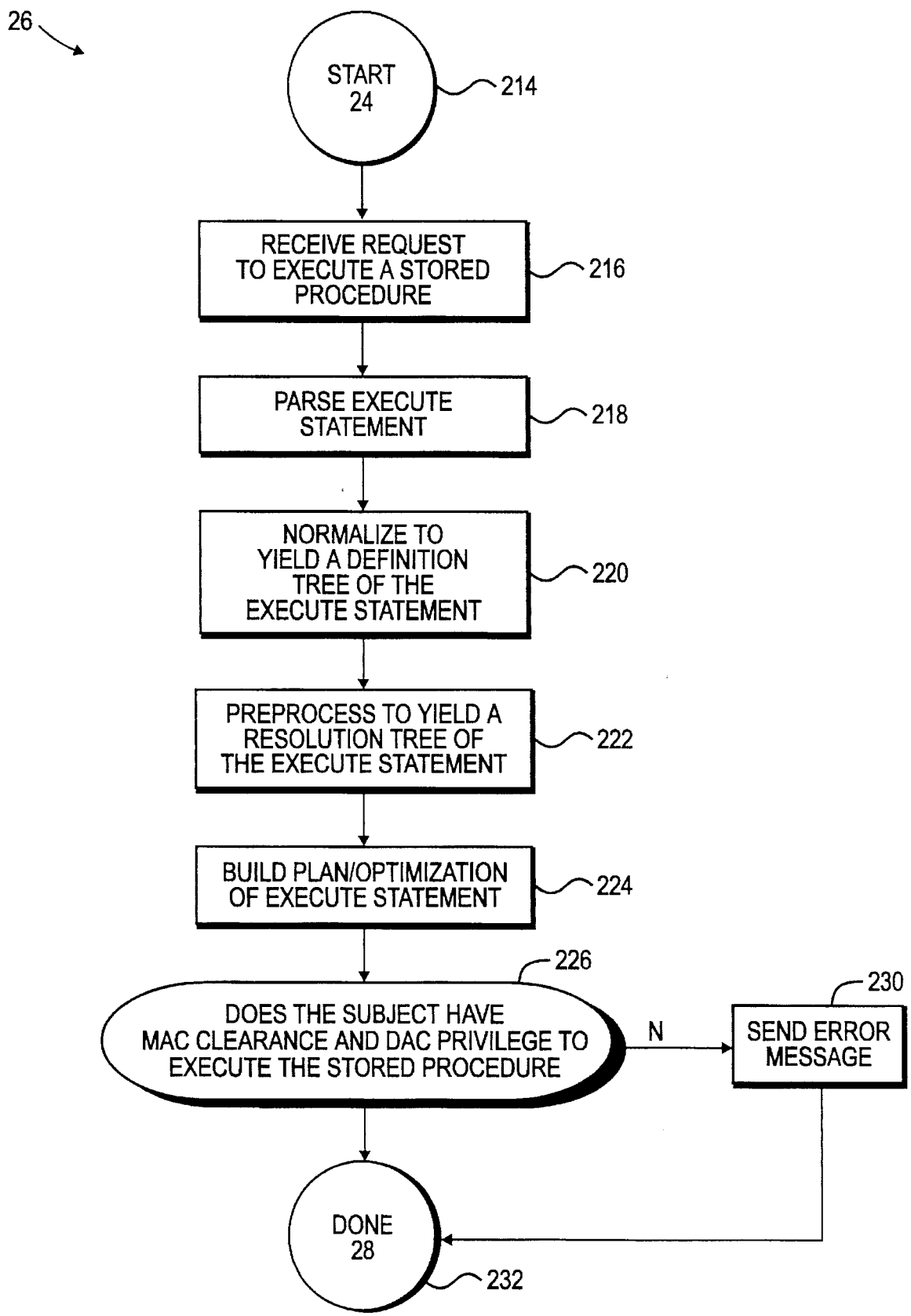
FIG. 8 is a process flow diagram detailing the steps employed to compile an "execute stored procedure" statement.

FIG. 8 shows the principal steps employed in executing a stored procedure after the stored procedure has been compiled as described in connection with FIG. 7. These steps correspond to general step 26 of FIG. 3. The process starts at 214 and proceeds to a step 216 where the server receives a request to execute a stored. procedure. In SQL, the command would be "EXECUTE [stored procedure name]." Thereafter the execute command is parsed to produce a parse tree in a step 218. This step is performed by the parser in the same manner as step 204 of FIG. 7. In this case, however, the parser is only acting on the EXECUTE statement itself (i.e., a one line command), not the statements in the stored procedure. The EXECUTE statement must itself be compiled before execution because it is a SQL statement. Of course, parsing an execute command is typically a much simpler procedure than parsing an entire stored procedure having a complex group of instructions including, for example, iterative loops, subroutine calls, etc. After step 218 is performed, a step 220 normalizes the parse tree to produce a definition tree. Again, this is performed only for the execute statement and does not involve the details of the stored procedure. Next, a step 222 preprocesses the definition tree produced in step 220 to yield a resolution tree for the execute statement. From this resolution tree, a step 224 builds and optimizes a plan for execution. At this point, the EXECUTE statement itself has been compiled, but no steps have yet been taken that involve the content of the stored procedure asked to be executed. This process has been performed simply to prepare the "EXECUTE" statement for execution.

Now before the process can actually execute the stored procedure, a security check of the subject must be made. More particularly, the system must make sure that the subject has the necessary MAC and DAC clearances to execute the stored procedure. For DAC, this simply means that the server checks to ensure that the SSO or the owner of the stored procedure has granted permission for the subject to execute. For MAC, this means that the subject's current read label must dominate the stored procedure's sensitivity label. Thus, a decision step 226 determines whether the subject has clearance to execute the stored procedure. If so, the process is completed at 232. This leaves the process at step 28 of FIG. 3 (pushing the task's sequence frame). If the question posed in step 226 is answered in the negative, a step 230 sends an error message. Because the subject does not have clearance to execute the stored procedure, the process is then completed—without execution—at 232.

As noted, whether a subject has clearance to execute a stored procedure is typically determined by his or her "curread" label. In preferred embodiments, at login, subjects' tasks are given one or more labels (analogous to the read and write sensitivity labels given to stored procedures). Multi-level users have curread and a curwrite session labels that can be adjusted by the user during a session. In addition, tasks for "multilevel users" are configured with rainwrite, maxread, and maxwrite boundary labels at login time. These establish the limits within which the user can set his or her session labels. Tasks of "single-level users" are given only a single label corresponding to minwrite.

The steps of parsing, normalization, preprocessing, and plan building described above (in connection with FIGS. 3, 7, and 8) are all conventional steps employed in compiling stored procedures. The details of these steps are well-known to those of skill in the art. Preprocessing involves various functions such as view resolution, default aggregate support, default values/result list order domain role enforcement, etc. Other compilation procedures could also be used with the present invention so long as they bind specific instances of referenced objects to the compiled version of the stored procedure, and provide some method for detecting changes in the instances of the referenced objects.

Figure 9:
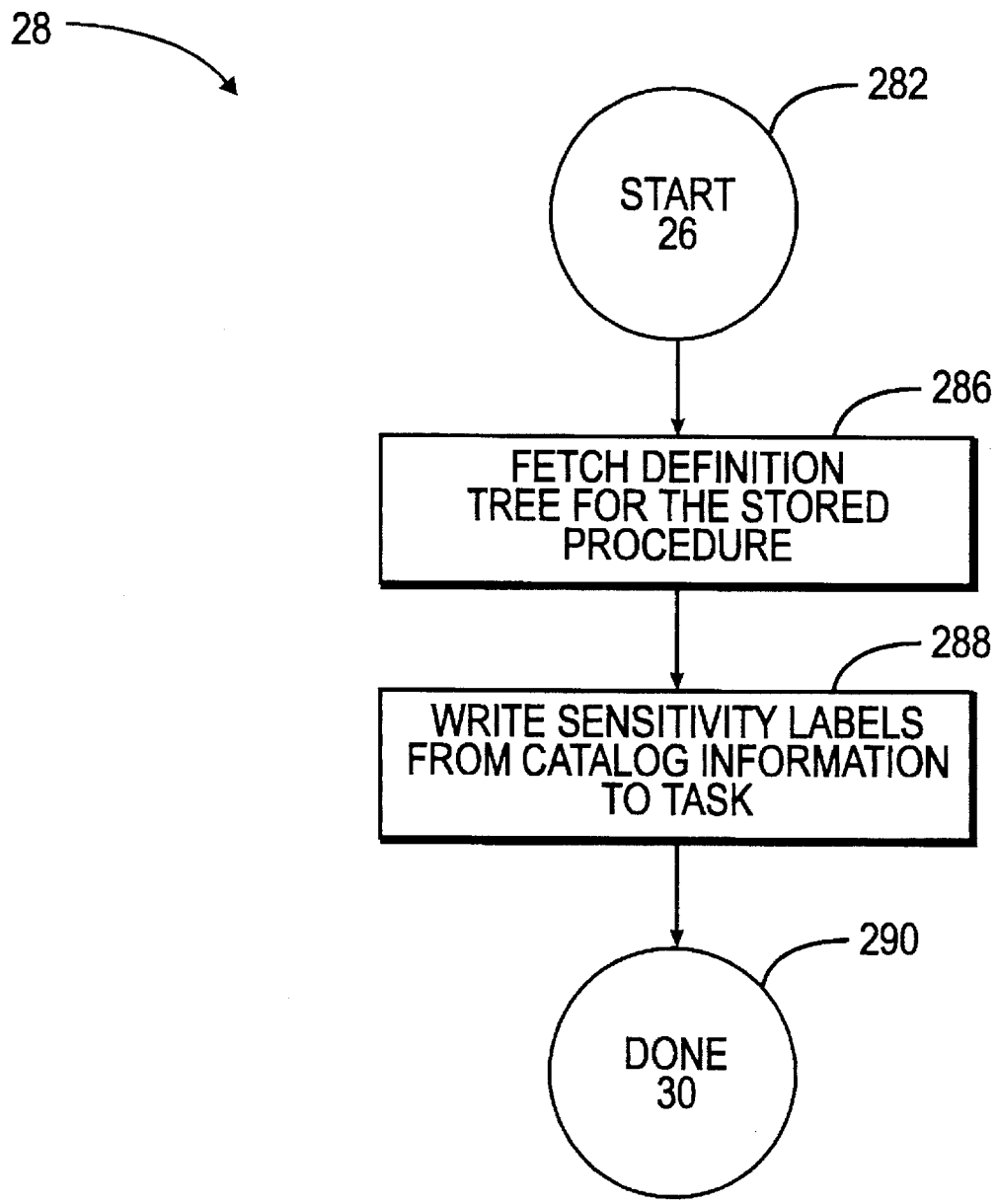
FIG. 9 is a process flow diagram showing the main steps associated with applying a trusted stored procedure's sensitivity labels to a subject's task.

As noted in connection with the discussion of FIG. 3, a trusted stored procedure's read and write sensitivity labels are applied to the subject's task before the trusted stored procedure is executed. FIG. 9 details the process by which a trusted stored procedure's labels are applied to a user's current task (i.e., step 28 of FIG. 3). The process begins at 282 (after step 26 of FIG. 3) and ends at 390 (before step 30 of FIG. 3). After the current sensitivity labels in the sequence frame of the task are pushed, a step 286 fetches the stored procedure's definition tree including its sensitivity labels. Next, the fetched sensitivity labels are written to the sequence frame in a process step 288. The process is then completed at 290. The inverse step of reapplying the initial sensitivity labels (step 46 of FIG. 3) simply involves removing the sensitivity levels associated with the trusted stored procedure from the sequence frame of the current task.

Often the user's personal or login sensitivity labels will be the labels pushed in this process, but this is not necessarily the case. For example, sometimes during execution one trusted stored procedure calls a second trusted stored procedure. This process is described as a "nesting" of the stored procedures. During the transition from the first to the nested second trusted stored procedure, the sensitivity labels of the first trusted stored procedure are pushed to make room for those of the second.

As noted, the processes described above sometimes require reference to the system catalog in order to determine the labels, states, etc. associated with a database object. FIG. 10 shows an exemplary portion of a system catalog table in accordance with the present invention. As noted, the system catalog provides various attributes of database objects. Specifically, these attributes include the object's name, ID, certification state, access sensitivity, and read/write sensitivity labels. In the table shown, there are three rows, each representing a different object. The first row contains information for a stored procedure named "Sproc_1." The second row contains information for a table named "T1." Finally, the last row contains information for a view named "V1." Of course, numerous other objects could be described in the system catalog. The first column of the catalog table refers to the object's "sensitivity." This is the "access sensitivity" referred to above and it provides the sensitivity level with which the subject's labels are compared before allowing to access the object. For example, in order to access (and thereby execute) the stored procedure "Sproc_1," the subject must have curread value that dominates "classified." The access sensitivity for the other objects in this example are "secret" for table T1 and "confidential" for view V1. In preferred embodiments, every row in every table in every database, including all system tables, is assigned an access security label. After access sensitivity, the next columns in the catalog contain the name and ID of the object. As noted, an object's ID will change with each new instance, even though its name can remain unchanged. The column with the heading "state" lists the certification state of the object. In preferred embodiments, only stored procedures, triggers, and views contain certification states. Thus, the certification state of table T1 in FIG. 10 is shown to be "null." The certification state for stored procedure "Sproc_1" is shown to be "certified." If the server or SSO subsequently determines that Sproc_1's state should be adjusted to "suspect," the system catalog would reflect this by changing the column entry accordingly. Next, three columns for read and write sensitivity labels are provided in the system catalog. These include the "maxread," "maxwrite," and "minwrite" boundary levels. Other columns for sensitivity labels are "curread" and "curwrite." As noted, these labels are associated with trusted stored procedures and triggers. As shown in FIG. 10, Sproc_1 is a trusted stored procedure because it contains the read and write sensitivity labels. If it was simply a normal stored procedure—rather than a trusted stored procedure—its read and write sensitivity labels would be null, like those of T1 and V1.

Tables and databases are sometimes referred to as "container objects" because they "contain" other objects such as rows. For such container objects, the access sensitivity label also serves as a "hurdle," which corresponds to the minimum curread label that a subject must have to access the rows or tables contained in the table or database. Container objects also have two additional labels called "maxhold" and "minhold," which describe the highest and lowest sensitivity levels of objects that the container can hold.

Figure 11:
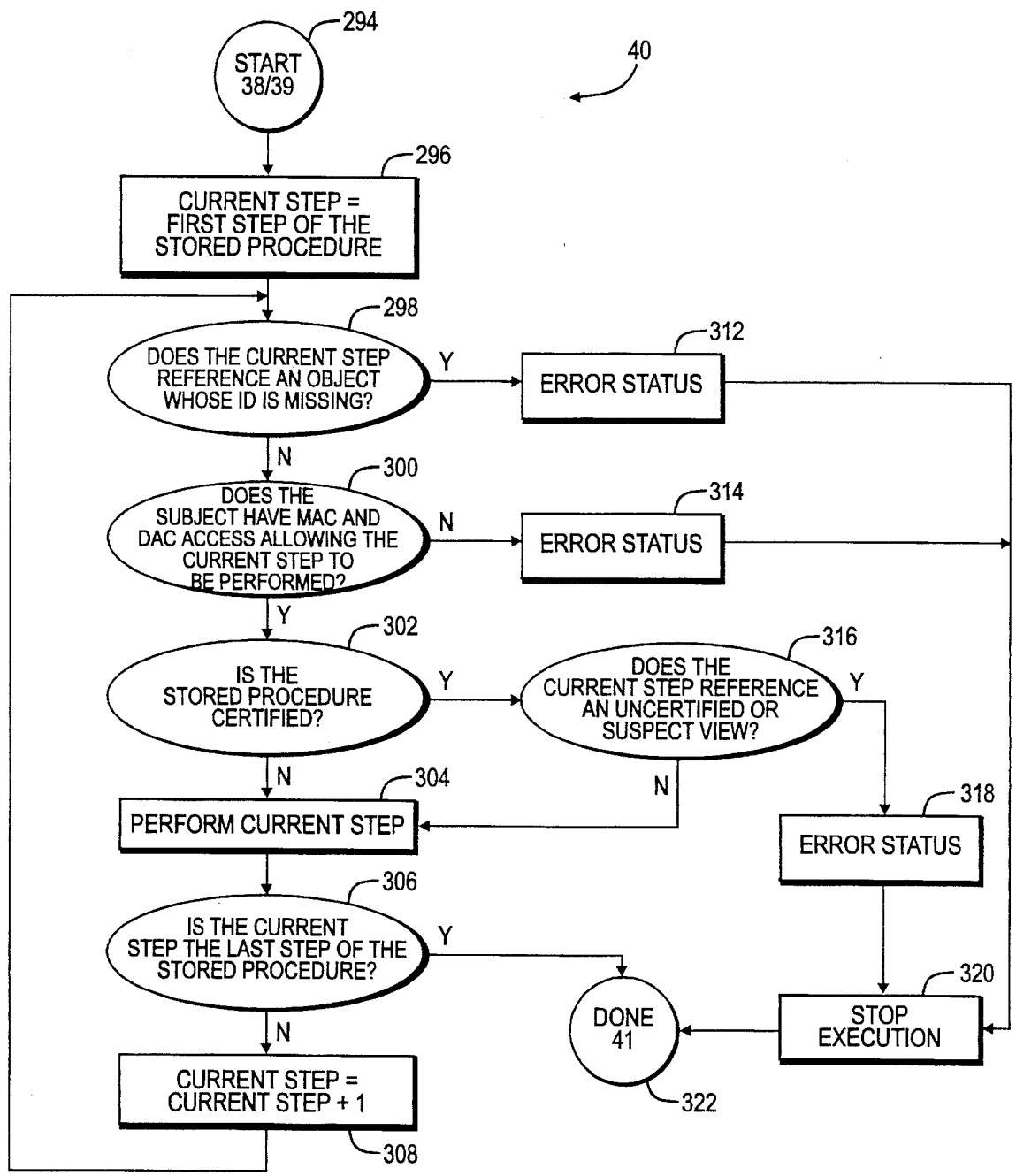
FIG. 11 is a process flow diagram detailing the process of executing a multistep stored procedure in accordance with the present invention.

The process employed in performing the individual steps of the stored procedure (step 40 of FIG. 3) is detailed in FIG. 11. To this point in the process, the stored procedure and the execute statement have been normalized/compiled. Further, the server has determined that the subject can access to the stored procedure and that the stored procedure is not in a suspect certification state. Also, by now the server has determined whether the stored procedure is "trusted." The process begins at 294 (after step 38 or 39 of FIG. 3) and ends at 322 (before step 41 of FIG. 3). From 294, the process proceeds to a step 296 where the current step (i.e., the step of the stored procedure under consideration) is set equal to the first step of the stored procedure. Thereafter, a decision step 298 determines whether the current step references an object whose ID is missing. As noted, a missing ID is a security-relevant event. If decision step 298 determines that an ID is missing, an error status is detected in a step 3 12. Then, execution is stopped in a step 320 and the process is concluded at 322.

Assuming that step under consideration does not reference an object whose ID is missing (i.e., decision step 298 is answered in the negative), a decision step 300 determines whether the task (or subject) has a MAC and a DAC access allowing the current step to be performed. If decision step 300 is answered in the negative, an error status is detected in a step 314 and execution is stopped in a step 320 as described above. If, on the other hand, decision step 300 is answered in the affirmative, a decision step 302 determines whether the stored procedure is a "certified" stored procedure. If so, the current step must meet special criteria before execution as will be described below. Assuming that the current step is not part of a "certified" stored procedure, the current step is performed in step 304. Thereafter, a decision step 306 determines whether the current step is the last step in the stored procedure. If so, the process is completed at 322. If not, a step 308 moves the process to the next step and process control returns to decision step 298 where the next step is considered. Thereafter, the current step is subjected to the same set of checks (represented by decision steps 298, 300, 302, and 306) as was the previous step. When the last step of the stored procedure is reached, decision step 306 directs the process to 322 where the stored procedure is exited.

If decision step 302 determines that the current step is part of a certified stored procedure, a decision step 316 determines whether the current step references an uncertified or suspect view (as noted, views can be certified). If the decision step 316 is answered in the negative, the step is executed in step 304 and the process proceeds as described above. If however, decision step 316 determines that the current step does reference an uncertified or suspect view, a step 318 detects an error status. Thereafter, the execution is stopped in step 320 and the process is concluded at 322.

The present invention finds use in a variety of security systems far removed from the traditional MAC and DAC policies. For example, it may be used to implement a "Clark Wilson" security policy. In a seminal paper by Clark and Wilson (Clark, D. D., and D. R. Wilson, "A Comparison of Commercial and Military Computer Security Policies," (1987) *Proceedings of the IEEE Symposium on Research in Security and Privacy,* Oakland, Calif., which is incorporated herein by reference for all purposes), a new paradigm for integrity was presented. Rather than being based upon the subject and object relationships of MAC, the Clark-Wilson policy is based upon (1) well-formed transformation procedures, and (2) objects ("constrained data items"). The only way sensitive objects (constrained data items) can be accessed is through "well-formed transformation procedures." Thus, the character of the access procedure rather than the relationship between the subject and object determines whether an object can be accessed in a Clark-Wilson system.

Various features of the present invention allow it to be used in implementing a Clark-Wilson security policy. First, the present invention ensures that a subject cannot access certain sensitive objects directly—only through certified trusted stored procedures or triggers. Thus, the invention provides a well-formed transaction in the form of a certified trusted stored procedure. These transactions (trusted stored procedures) can be entered only by users having the necessary DAC and MAC clearances. Second, the present invention provides Clark-Wilson constrained data items in the form of objects configured with sensitivity labels that can be dominated only through a trusted stored procedure. By properly configuring the labels of an object a natural encapsulation is provided.

While this invention has been described in terms of several preferred embodiments, it is contemplated that alterations, modifications and permutations thereof will become apparent to those skilled in the art upon a reading of the specification and study of the drawings. Furthermore, certain terminology has been used for the purposes of descriptive clarity, and not to limit of the present invention. For example, the statements referenced herein have been primarily in SQL, but there is no reason why the present invention could not be implemented in a different language. It is therefore intended that the following appended claims include all such alterations, modifications and permutations as fall within the true spirit and scope of the present invention.

What is claimed is:

1. A method of improving the security of a database in a computer system, the database comprising a plurality of stored objects, at least some of which are executable objects, said executable objects referencing other objects and having certification states, the method comprising the steps of:

if an executable object meets defined security criteria, certifying the executable object such that its certification state is certified;

if one or more defined security-relevant changes occur to one or more of the objects referenced by a certified executable object, automatically changing the certification state of the certified executable object from certified to suspect; and preventing execution of the suspect executable object until its certification state is no longer suspect.

2. The method of claim 1 wherein the step of certifying an executable object comprises the step of certifying one of a stored procedure, view, or trigger.

3. The method of claim 1 wherein the step of changing the certification state of the certified executable object from certified to suspect includes the step of identifying one or more views or tables referenced by the executable object as having undergone one or more of said defined security-relevant changes.

4. The method of claim 1 wherein the step of changing the certification state of the certified executable object from certified to suspect includes the step of identifying one or more views or tables referenced by the executable object as having been deleted and recreated.

5. The method of claim 1 wherein the step of certifying an executable object includes a step of having a database security officer certify said executable object.

6. A method of permitting a subject having current read and write labels to access a database object in a computer system, the object having an access sensitivity label, the database including a procedure referencing the object, and the procedure having its own access sensitivity label and current read and write labels, the method comprising the following steps:

certifying the procedure as meeting defined security criteria;

initiating a task on behalf of the subject;

applying the subject's current read and write labels to the task so that the procedure's current read and write labels constitute the task's current read and write labels;

initiating execution of the certified procedure if the subject's current read label dominates the procedure's access sensitivity label;

applying the procedure's current read and write labels to the task;

comparing the task's current read and write labels to the object's access sensitivity label to determine whether the task has authorization to access the object;

determining whether the procedure references any object that has undergone a security-relevant change after the procedure was certified; and if the task has mandatory access control authorization to access the object and the procedure does not reference an object that has undergone a security-relevant change as determined in the steps of comparing and determining, permitting the procedure to access the object.

7. The method of claim 6 further comprising the following steps:

exiting execution of the procedure; and applying the subject's current read and write labels to the task after exiting execution.

8. The method of claim 6 wherein the step of determining whether the procedure references any object that has undergone a security-relevant change includes a step of determining whether a table or a view referenced by the procedure has been deleted.

9. The method of claim 6 further comprising a step of applying to the task maximum and minimum boundary labels defining upper and lower limits of the procedure's current read and write labels, said step of applying maximum and minimum boundary labels being performed after the step of initiating execution of the procedure and before the step of permitting the procedure to access the object.

10. The method of claim 9 further comprising a step of adjusting the procedure's current read or write labels within said upper and lower limits during execution.

11. The method of claim 6 further comprising the following steps:

initiating execution of a nested procedure called by the procedure; and applying current read and write labels of the nested procedure to the task.

12. The method of claim 6 wherein the step of initiating execution of the procedure in the task comprises initiating execution of a trigger.

13. The method of claim 6 further comprising a step of determining, before the step of initiating execution of the certified procedure, whether the subject has a discretionary access control privilege to access the certified procedure.

14. A method of improving the security of a database in a computer system, the database comprising a plurality of stored objects, at least some of which are executable objects, said executable objects having a certification state, an access sensitivity label, and current read and write labels, the method comprising the following steps:

certifying an executable object such that its certification state is certified if the executable object meets defined security criteria;

compiling the certified executable object;

initiating a task on behalf of the subject; and if a read sensitivity label of the subject dominates the certified executable object's access sensitivity label,
  (i) applying the current read and write labels of the certified executable object to the subject's task,
  (ii) determining whether the certified executable object references any objects which have undergone one or more defined security-relevant changes after the executable object was compiled, and
  (iii) if the certified executable object does not reference any objects which have undergone one or more defined security-relevant changes after the executable object was compiled, executing the certified executable object.

15. The method of claim 14 wherein the step of executing the certified executable object includes the following steps:

changing the certification state of the certified executable object from certified to suspect if said one or more defined security-relevant changes has occurred to any of the objects referenced by said certified executable object; and preventing re-execution of a suspect executable object until its certification state is no longer suspect.

16. The method of claim 15 wherein the step of changing the certification state of the certified executable object from certified to suspect includes a step of identifying a table or a view that has been deleted, the table or view being referenced by the executable object.

17. The method of claim 14 wherein the step of certifying an executable object comprises a step of certifying one of a stored procedure, view, or trigger.

18. The method of claim 14 wherein the step of certifying an executable object includes a step of having a database security officer certify said executable object.

19. The method of claim 14 further comprising the following steps:

exiting execution of the procedure; and applying the subject's current read and write labels to the task after exiting execution.

20. The method of claim 14 further comprising a step of applying to the task maximum and minimum boundary labels defining upper and lower limits of the executable object's current read and write labels, said step of applying maximum and minimum boundary labels being performed after the step of initiating a task on behalf of the subject and before the step of executing the certified executable object.

21. The method of claim 20 further comprising a step of adjusting the executable object's current read or write labels within said upper and lower limits during execution.

22. A computer system comprising:

a processor;

a memory;

a stored procedure capable of running on said processor, the stored procedure having a defined certification state and referencing one or more referenced objects stored in said memory;

means for explicitly changing the certification state of the stored procedure in accordance with defined security criteria;

means for implicitly changing the certification state of the stored procedure from a certified certification state to a suspect certification state if a defined security relevant change occurs to any of the one or more referenced objects; and means for preventing suspect stored procedures from re-executing until their certification state has been changed to a state that is not suspect by the means for explicitly changing the certification state of a stored procedure.

23. The computer system of claim 22 further comprising a system catalog stored in said memory, the system catalog including an access sensitivity label for the stored procedure.

24. The computer system of claim 23 further comprising means for denying a subject having a current read label access to the stored procedure when the subject's current read label does not dominate an access sensitivity label of the stored procedure.

25. The computer system of claim 23 wherein the system catalog also includes read and write labels for the stored procedure.

26. The computer system of claim 25 further comprising means for replacing one or more read and write labels of a subject with the read and write labels of the stored procedure when the subject initiates execution of the stored procedure.

* * * * *